US011856106B2

(12) United States Patent
Falk

(10) Patent No.: US 11,856,106 B2
(45) Date of Patent: Dec. 26, 2023

(54) SECURE CONFIGURATION OF A DEVICE

(71) Applicant: Siemens Aktiengesellschaft, Munich (DE)

(72) Inventor: Rainer Falk, Poing (DE)

(73) Assignee: SIEMENS AKTIENGESELLSCHAFT

(*) Notice: Subject to any disclaimer, the term of this patent is extended or adjusted under 35 U.S.C. 154(b) by 356 days.

(21) Appl. No.: 16/326,945

(22) PCT Filed: Jul. 4, 2017

(86) PCT No.: PCT/EP2017/066606
§ 371 (c)(1),
(2) Date: Feb. 21, 2019

(87) PCT Pub. No.: WO2018/036702
PCT Pub. Date: Mar. 1, 2018

(65) Prior Publication Data
US 2019/0280872 A1 Sep. 12, 2019

(30) Foreign Application Priority Data
Aug. 24, 2016 (DE) ...................... 10 2016 215 915.1

(51) Int. Cl.
H04L 29/06 (2006.01)
H04L 9/32 (2006.01)
(Continued)

(52) U.S. Cl.
CPC ............ *H04L 9/3236* (2013.01); *G06F 21/62* (2013.01); *G06F 21/64* (2013.01); *H04L 9/3247* (2013.01); *H04L 9/50* (2022.05); *H04L 2209/56* (2013.01)

(58) Field of Classification Search
CPC . H04L 9/3236; H04L 9/3247; H04L 2209/38; H04L 2209/56; G06F 21/62; G06F 21/64
See application file for complete search history.

(56) References Cited

U.S. PATENT DOCUMENTS 7,578,436 B1* 8/2009 Kiliccote ............. G06F 21/606
235/382
9,351,124 B1 5/2016 Shelton et al.
(Continued)

FOREIGN PATENT DOCUMENTS

CN 103098415 A 5/2013
CN 103403708 A 11/2013
(Continued)

OTHER PUBLICATIONS

Antonopoulos "Mastering Bitcoin. Unlocking Digital Crypto-Currencies", O'Reilly Media, Apr. 2014 (Year: 2014).*
(Continued)

*Primary Examiner* — Taghi T Arani
*Assistant Examiner* — Lin Chang
(74) *Attorney, Agent, or Firm* — Schmeiser, Olsen & Watts LLP

(57) ABSTRACT

Provided is a method for secure configuration of a device, having the following steps:—ascertaining a block chain data structure based on a cryptocurrency, wherein the block chain data structure has at least one block containing transaction data;—ascertaining at least one transaction belonging to the transaction data, the transaction having a piece of device configuration information;—examining the block chain data structure; and—configuring the device on the basis of the piece of device configuration information on successful examination. A complex independent examination by the device or an entity associated with the device is dispensed in an advantageous manner. The complex step of examination of the actual transaction is transferred to the block chain network and the client merely needs to validate a block chain data structure on the basis of a stability of the block chain.

13 Claims, 1 Drawing Sheet

(51) Int. Cl.
*G06F 21/62* (2013.01)
*G06F 21/64* (2013.01)
*H04L 9/00* (2022.01)

(56) References Cited

U.S. PATENT DOCUMENTS

| | | | |
|---|---|---|---|
| 10,826,685 B1* | 11/2020 | Campagna | H04L 9/3247 |
| 2007/0097992 A1* | 5/2007 | Singh | H04L 61/5007 370/395.54 |
| 2007/0230691 A1 | 10/2007 | Elhamias et al. | |
| 2010/0318468 A1 | 12/2010 | Carr et al. | |
| 2013/0179687 A1 | 7/2013 | Falk et al. | |
| 2014/0052833 A1 | 2/2014 | Ritvanen et al. | |
| 2014/0279432 A1 | 9/2014 | Holman et al. | |
| 2015/0009944 A1* | 1/2015 | Li | H04W 72/23 370/329 |
| 2015/0244690 A1 | 8/2015 | Mossbarger | |
| 2015/0379510 A1 | 12/2015 | Smith | |
| 2016/0027229 A1 | 1/2016 | Spanos et al. | |
| 2016/0261685 A1* | 9/2016 | Chen | H04L 41/082 |
| 2016/0261690 A1* | 9/2016 | Ford | G06F 21/64 |
| 2017/0026236 A1 | 1/2017 | Falk et al. | |
| 2017/0091750 A1* | 3/2017 | Maim | H04L 9/30 |
| 2017/0279783 A1* | 9/2017 | Milazzo | H04L 63/0435 |
| 2020/0344073 A1* | 10/2020 | Dix | H04L 41/0803 |

FOREIGN PATENT DOCUMENTS

| | | |
|---|---|---|
| CN | 104735164 A | 6/2015 |
| CN | 105515872 A | 4/2016 |
| CN | 105678182 A | 6/2016 |
| CN | 105844505 A | 8/2016 |
| CN | 105871855 A | 8/2016 |
| DE | 102014206989 A1 | 10/2015 |
| JP | 2015162163 A | 9/2015 |
| WO | 2016029119 A1 | 2/2016 |

OTHER PUBLICATIONS

Christidis Konstantinos et al: "Blockchains and Smart Contracts for the Internet of Things", IEEE Access, vol. 4, pp. 2292-2303, XP011613134, DOI: 10.1109/ACCESS.2016.2566339, retrieved on Jun. 3, 2016; abstract pp. 2296-22298, p. 2293, left column, paragraph 1-3, p. 2296, left column, paragraph 3, p. 2298, left column, last paragraph, p. 2298, right column, last and penultimate paragraph, abstract, fig. 1; 2016.
PCT International Search Report for PCT/EP2017/066606 International Searching Authority dated Sep. 18, 2017.
Panikkar, Sanjay et al: "ADEPT: An IoT Practitioner Perspective Draft Copy for Advence Review"; pp. 1-18; Dec. 31, 2015; Final copy to be distributed through IBM Institute for Business Value. Visit ibm.biz/devicedemocracy.
Chinese Office Action dated Jun. 21, 2021 for Application No. 201780065773.X.

* cited by examiner

US 11,856,106 B2

SECURE CONFIGURATION OF A DEVICE

CROSS-REFERENCE TO RELATED APPLICATIONS

This application claims priority to PCT Application No. PCT/EP2017/066606, having a filing date of Jul. 4, 2017, which is based on German Application No. 10 2016 215 915.1, having a filing date of Aug. 24, 2016, the entire contents both of which are hereby incorporated by reference.

FIELD OF TECHNOLOGY

The following relates to a method and a component for securely configuring a device by means of blockchain technology.

BACKGROUND

A configuration of a multiplicity of devices that are provided within an automation network is carried out within an industrial setting. Here, information items in relation to the device configuration are provided in a data record. In particular, provision is made of central device management servers, on which the data records with the provided configuration are stored and from which configurations are downloaded for the implementation on a device.

Configuration data should be checked in respect of their integrity or validity or origin, particularly within an industrial setting. By way of example, it is necessary to ensure that unmanipulated parameters or an intact program or a suitable configuration are contained in the configuration data, for example in order to satisfy safety requirements or security requirements.

Such manipulation protection of device configuration data is usually ensured by means of centralized security entities. In particular, public key infrastructures are used to authenticate a device management server. The provision of such a central structure is expensive and complicated. The outlay for creating centralized safety and device management infrastructure is uneconomical, particularly for relatively small automation systems.

Against this background, it is an object of embodiments of the present invention to simplify secure configuring of a device.

SUMMARY

An aspect relates to a method for securely configuring a device, including the following steps:
  ascertaining a blockchain data structure based on a cryptocurrency, wherein the blockchain data structure has at least one block with transaction data;
  ascertaining at least one transaction associated with the transaction data, wherein the transaction includes a device configuration information item;
  checking the blockchain data structure; and
  configuring the device depending on the device configuration information item in the case of a successful check.

The blockchain technology realizes a distributed, decentralized database, in which transactions are storable with protection against manipulation. To this end, transactions are stored in a block. In addition to one or more transactions, such a blockchain data structure stores a hash value of the preceding block. The protection arises from a plurality of trustworthy nodes in a blockchain network, which carry out so-called mining or validating of blocks. In the network of the nodes participating in the blockchain, a new block is formed at regular intervals, for example every 10 minutes, and the hash value of an existing block is also stored in the process. The validity of transactions to be stored in the block is checked during this mining process. In addition, a so-called cryptographic puzzle is solved, for which the mining nodes must apply computational capacity. By way of example, the outlay is rewarded with a certain amount in the cryptocurrency on which the blockchain is based. Solving the cryptographic puzzle is also referred to as a proof-of-work verification. The solution to a computationally intensive problem, which should be solved depending on the content of a block, is verified. The chain of blocks is stored in a multiplicity of blockchain nodes; the participating nodes are synchronized. Thus, information in relation to the transactions is stored in the network in redundant fashion.

A chain is formed since all blocks are formed on the basis of existing blocks by virtue of the hash value of the preceding block being inserted into a new block. Consequently, the transactions are secured against manipulation since a chain can be traced back to an initial block, also referred to as a genesis block, as a result of the linking of the blocks. Since the transactions are available by way of the blockchain network, it is possible to identify, for example, the block in the chain from which a content of a transaction no longer corresponds to previous versions. Thus, the transactions are stored so as to be protected against manipulation in each verified blockchain. Modifying a transaction in a block that was already formed in the network at an earlier time could be identified when a checksum formation is traced over the existing blocks.

Within a blockchain network, which is public and therefore does not allow each node to be trusted individually, a block is validated by third nodes in the network, which, in particular, do not carry out independent mining, by virtue of, in particular, waiting for a certain time after the creation of the block or waiting for a certain number of blocks formed after the block, until the chain is long enough to be trusted. By way of example, a different chain path forms in parallel; this was found to be unreliable since a plurality of the nodes do not verify the transactions of the blocks or of one block formed therein but instead form further blocks in the trustworthy longer chain. For this, an attacker must not have available more computational capacity than the remainder of the blockchain put together as they could otherwise form sufficiently long chains more quickly by dedicated mining with an intention to defraud.

A blockchain data structure or block comprises transaction data and at least one hash value, which is formed depending on the preceding block. As a result, a chain of transactions is formed. Once transactions occur in the chain, they can no longer be modified unnoticed. The transaction data relates to a transaction or a plurality of transactions. A blockchain data structure contains, in particular, a checksum of transaction data or this checksum and further data, such as a timestamp, for example. By way of example, a checksum of transaction data, which consist of a plurality of transactions, is formed. In particular, cryptographic hash functions are used for forming the checksum.

As a result of so-called mining of the blocks for an incentive, which is created, for example, by an amount of the cryptocurrency, there is an interest for the decentralized network structure to confirm blocks as being correct or validate blocks, i.e., carry out mining. Provided the majority of the computational capacity in such a distributed network is free from attackers, i.e., no attacker can output more blocks by mining, in particular to solve more cryptographic puzzles, than the trustworthy nodes put together, it is possible to trust a blockchain above a certain length and, in particular, a single block after a certain number of blocks following in the path of the chain.

Known blockchain systems include Bitcoin and Ethereum. While Bitcoin was originally created for cryptocurrency transfers, Ethereum builds on the inclusion of so-called smart contracts. The conditions agreed in a smart contract are saved by the blockchain and the contract itself is handled over the network. Implementation of the contract conditions is monitored by way of associated performed transactions and subsequent actions provided in a programmed smart contract can be carried out depending on what transaction has been carried out.

Blockchains in which mining is carried out without incentive, for example because all nodes are trusted, are also conceivable for non-public blockchain systems.

In particular, the transaction data are not inserted into the blockchain as plain text; instead, a hash value of the transaction is formed for the purposes of forming the transaction data. The transaction itself is likewise available in the blockchain network. Consequently, the transaction can be checked by mining nodes or miners. Thus, the transaction in plain text is distributed in the network and, in particular, transmitted from a device to one or more blockchain nodes.

Advantageously, the transaction, and hence the transaction data, too, are based on a device configuration information item. A transaction associated with transaction data includes the device configuration item in plain text, for example. Likewise, the transaction may merely include a checksum of the device configuration information item. In particular, mining is then carried out on the basis of further data contained in a transaction.

By way of example, ascertaining the blockchain data structure and the transaction is carried out by a device itself, in particular by a processor of the device. To this end, the device is coupled to the blockchain network. In particular, the device is a node of the blockchain network. By way of example, the device scans transactions available in the network in view of whether these have a configuration information item provided for the device. By way of example, this is implemented by way of a device identifier. Then, for example, a check is carried out as to whether the transaction was validated by the blockchain network. To this end, blocks that were formed on the basis of the transactions are ascertained and an analysis carried out as to whether a block is validated in relation to this transaction on the basis of the blockchain, i.e. a chain of blocks. In particular, a length of the chain or a number of blocks following the relevant block with the transaction is checked. If a chain with the relevant block prevails, the assumption is made that the transaction data present in the blockchain data structure are trustworthy. In this case, a check is successful. Criteria on the basis of which the check is classified as successful or not successful can be set for the check. If the underlying transaction is trusted, the device configuration information item contained in the transaction is recognized as non-manipulated. In another variant, a node can check the blockchain such that it knows all valid transactions that are confirmed by the blockchain. Then said node, for example, filters out those transactions that relate thereto, e.g., only the most current transaction. If the current transaction relevant thereto is complete and does not only contain changes, said block, for example, may not necessarily need the earlier transactions. Further, optimized methods are conceivable for ascertaining the relevant configuration data. By way of example, a heuristic search is carried out. If it is known that configuration changes are made public at certain times, it is possible, in targeted fashion, to search through blocks which lie in an appropriate period of time and the transactions contained therein.

Advantageously, a complicated independent check by the device or an entity assigned to the device is dispensed with. The complicated step of checking the actual transaction is transferred into the blockchain network and all that is required on part of the client is to validate a blockchain data structure on the basis of a stability of the blockchain.

The described steps can likewise be performed on a processor not formed on the device. By way of example, provision is advantageously made of a central computer in an automation network, said central computer ascertaining and checking the appropriate transactions with the associated blockchain data structure for a plurality of devices in the installation to be configured and prompting a configuration of the relevant devices in the case of a successful check.

The described steps need not be carried out in the listed sequence. Likewise, it is advantageous that, for example, the blockchain data structure is checked earlier in time than an ascertainment of at least one transaction associated with the transaction data. A person skilled in the art will be able to derive any sensible sequence from the description of the steps without departing from the scope of protection of embodiments of the invention.

According to one embodiment, the device configuration information includes a configuration of the device, a test value of a configuration of the device and/or a reference to a configuration, in particular a uniform resource identifier. Consequently, the transaction itself, which is available in the blockchain network, either directly stores the configuration data for a device or only a test value of, or a reference to, the configuration to be set.

According to one embodiment, the block has a checksum formed by the transaction or a plurality of transactions as transaction data and the transaction or the plurality of transactions are validated by means of the checksum. Consequently, the transaction or a plurality of transaction are not stored in plain text in the blockchain; instead, a hash value that is ascertained depending on one or more transactions, in particular, is entered therein.

According to one embodiment, the transaction data or the transaction are secured by a cryptographic checksum and a check of the transaction data or the transaction is carried out with the aid of the cryptographic checksum and a cryptographic key. By way of example, a digital signature can be entered into a block, wherein a key pair, which is set by a certain operator, is used for forming and checking the signature.

According to one embodiment, a key of a centrally managed key pair is used as a cryptographic key. By way of example, the device configuration information item in the transaction specifies that new firmware or a firmware update should be downloaded from a certain URL and a cryptographic checksum, for example a message authentication code or a digital signal, is only checkable with a suitable master key.

Alternatively, the transaction is secured by a preceding transaction in the blockchain. To this end, a first transaction may specify an initial configuration of the device. An information item about this transaction (initial configuration) is configured on the device during the manufacture or commissioning thereof, for example by the manufacturer. To this end, an identifier of the transaction, e.g., a hash value thereof or the public key that is usable for checking the signature of the initial configuration, can be configured. This transaction comprises a further public key or a hash of a public key. A further transaction, the signature of which is checkable by the public key of the transaction with the initial configuration, may specify changes or a new version of the configuration. A chain of configurations is formed in another variant. A transaction containing configuration information comprises a public key or a hash value of a public key. An updated configuration, i.e., a subsequent configuration transaction, is acknowledged to be valid if the signature thereof is checkable by the specified public key of the predecessors. Thus, in the process, a chain of signed transactions with a respectively current configuration information item is formed.

According to one embodiment, the transaction data specify an association of configuration data to the device and configuration data associated with the device are ascertained therefrom. As a result, a device can ascertain transactions relevant to the device. The relevant blocks are checked on the basis of the blockchain data structure for these transactions and the configuration data are processed as soon as a successful check of the blockchain data structure has been implemented. Here, a transaction with configuration data can relate to an individual device or to a group of devices with the same configuration. It is also possible to specify a plurality of configuration information items for different devices within the scope of one transaction.

According to one embodiment, a plurality of partial configurations for a device are ascertained from the device configuration information item and the device is configured accordingly in a plurality of partial configurations. This is advantageous in that a transaction need only comprise modified configuration information items. Furthermore, a device configuration for a device can be assembled from a plurality of partial configurations, wherein at least one partial configuration is updatable by way of a blockchain transaction. This has the additional advantage of the described device configuration management using a blockchain only being usable for certain configuration options of a device.

According to one embodiment, the partial configurations have priority specifications in order to prevent conflicts in the case of contradictory partial configurations.

According to one embodiment, the device configuration information item has project planning parameters, mode of operation information items, license or authorization information items, secure zone information items, information items in relation to patches or software updates, association information items of the device in relation to a backend or prescriptions for admissible configuration settings and/or contract information items for incentive-able configuration settings. By way of example, thresholds or control parameters are specified as project planning parameters. In particular, a servicing mode or time windows assigned to various modes of operation is/are specified as information items in relation to a mode of operation or mode of operation planning of an installation. Further, a specification relating to a mode of operation or an operative operation being sealed is contained. Further, information items in relation to trusted peers, i.e., groups of devices in a common secure zone, are advantageously contained. By way of example, device whitelisting or certificate whitelisting is stored in the information items such that identifiers or public keys or device certificates of devices in a secure zone are stored in the blockchain so as to be protected against manipulation. Further, release information items relating to an app or software code, such as, e.g., an authorization to be run on certain devices or run-time authorizations of an app or licensing information items are advantageously contained. It is likewise possible for release information items of patches for certain devices or device types and installations to be contained, as well as a specification about available patches or weaknesses of a system or affected points of a system. Further, an assignment of a device to a client or a subscription of a backend service may be stored. Consequently, an information item in relation to which devices transmit data to a backend is contained, with the backend assigning the arising fees to the specified subscription or client. It is likewise possible for group policies or group assignment prescriptions to be stored for the purposes of restricting admissible configuration settings or setting a restriction to fixedly predetermined configuration settings. Consequently, it is not the configuration that is explicitly contained in the blockchain but, instead, a master information item about admissible configuration values. Likewise, smart contracts can be contained in transactions, said smart contracts promising renumeration when certain target variables are present. By way of example, a device may adapt its control functionality and perform a so-called contract-adaptive control in order to adapt target variables, for example temperature or effectiveness or pollutant emissions, to the target variables in order to obtain remuneration.

Advantageously, the blockchain seals configuration of the device. A device only activates the configuration that is defined, predetermined or released in accordance with the blockchain.

According to one embodiment, functionalities of the device or parameters are adapted, or actions are carried out by the device, as a result of the configuring process. By way of example, a network address information item, in particular an IP address, a DNS name, a URL of a superordinate control computer for a field device, an associated MES system or a diagnostics server, is adapted. By way of example, control parameters for a controller, e.g., a PID controller, are modified. By way of example, thresholds for protective monitoring, e.g., a maximum admissible voltage or a maximum admissible current or a maximum admissible reactive power, are adapted. By way of example, a maximum admissible feed power for the device by a decentralized energy generator is set. By way of example, a control program is selected, or a control operation is adapted. In particular, a control functionality is adapted in such a way that criteria of a smart contract of a blockchain transaction are satisfied. By way of example, a registration of a device at a backend system is initiated or downloading and installing of a software update or a firmware update, for example a security patch or an add-on function, is initiated. Further, a vulnerable device functionality, for example, is deactivated or a device is blocked in the case of an unsecure software status. By way of example, a device firewall on the device as a personal firewall or a network firewall as a network infrastructure component for filtering network traffic between partial networks is activated or deactivated or adapted. By way of example, an intrusion detection system for identifying inadmissible program code or inadmissible communication relations is activated or adapted.

According to one embodiment, current transaction data of a configuration process are generated by the device for storage in a current block of a blockchain as a result of the configuring process. By way of example, transactions that depend on the current state of the project planning data are automatically generated and stored by a blockchain node in the blockchain depending on project planning data of a project planning tool.

According to one configuration, checking the blockchain data structure comprises validating the block on the basis of a plurality of successive blocks in a blockchain. In particular, it is possible to wait until a chain prevails, i.e., other nodes in the blockchain network likewise consider the blockchain data structure to be valid and, accordingly, produce further blocks in this chain.

The embodiments further relate to a component for securely configuring a device, comprising:
- an interface device for ascertaining a blockchain data structure based on a cryptocurrency, wherein the blockchain data structure has at least one block with transaction data, and for ascertaining at least one transaction associated with the transaction data, wherein the transaction includes a device configuration information item;
- a first unit, suitable for checking the blockchain data structure;
- a second unit for configuring the device depending on the device configuration information item.

The unit can be implemented in terms of hardware and/or else in terms of software. In the case of an implementation in terms of hardware, the respective unit can be embodied as an apparatus or as part of an apparatus, e.g., as a computer or as a microprocessor. In the case of an implementation in terms of software, the respective unit can be embodied as a computer program product (non-transitory computer readable storage medium having instructions, which when executed by a processor, perform actions), as a function, as a routine, as a part of program code or as an executable object.

BRIEF DESCRIPTION

Some of the embodiments will be described in detail, with reference to the following figures, wherein like designations denote like members, wherein.

DETAILED DESCRIPTION

Figure 1:
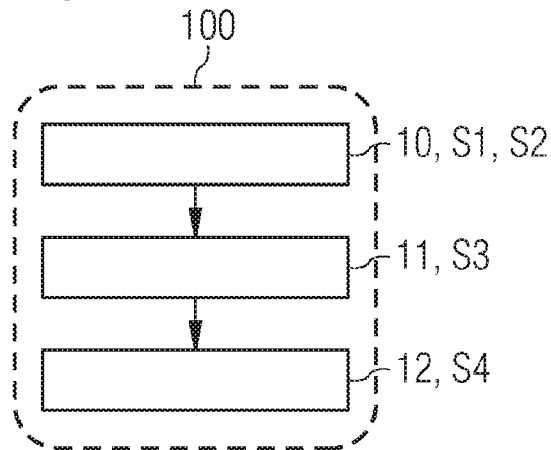
FIG. 1 shows a schematic illustration of the method and the component for securely configuring a device according to one exemplary embodiment of the invention.

FIG. 1 schematically shows how a component 100 for securely configuring a device is constructed. An interface device 10 is provided for ascertaining S1 a blockchain data structure based on a cryptocurrency and for ascertaining S2 at least one transaction associated with the transaction data. By way of example, the component is provided on a node of a blockchain network. This blockchain nodes initiates storage of the blockchain data structure and of individual transactions, which are interchanged in the blockchain network, in a local memory. In this way, the node synchronizes itself or the dataset of an associated network with the network. By way of example, a local entity thus comprises the transactions or a selection of the transactions circulating in the network, which underlie the formed blocks, and, in particular, portions of a blockchain, i.e., a portion of a blockchain data structure from a chain of blocks. A first processor unit 11 is suitable for checking S3 the blockchain data structure. This first processor unit 11 can be provided on hardware associated with the blockchain node, or else directly on the device. In particular, already the interface device 10 can be provided on the device.

Further, a second processor unit 12 is provided for configuring S4 the device depending on the device configuration information item. This second processor unit 12 may be provided centrally in an automation installation in order to be able to undertake configurations of a device or a plurality of devices. Additionally, the second processor unit 12 can likewise be provided directly on the device.

Figure 2:
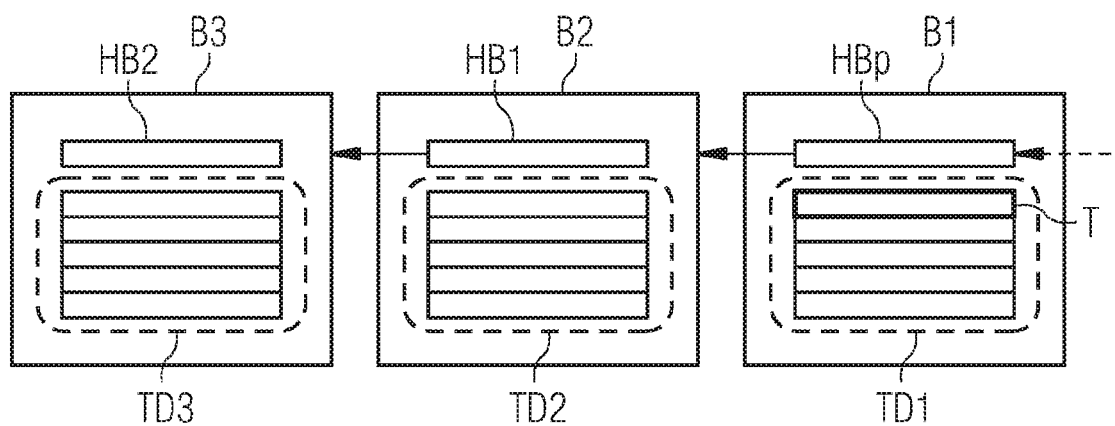
FIG. 2 shows a schematic illustration of a blockchain data structure with transaction data according to the exemplary embodiment of the invention.

FIG. 2 schematically elucidates a blockchain data structure consisting of a plurality of blocks, e.g., three blocks, B1 to B3. For elucidation purposes, an excerpt of a blockchain chain with three blocks B1, B2, B3 is shown. The blocks B1 to B3 each contain the hash value of the preceding block HBp, HB1, HB2. The block B1 has the hash value HBp of the preceding block; the black B2 has an entry in the data structure with the hash value HB1 of the preceding block B1. Likewise, the third block B3 has the hash value HB2 of the preceding block B2. When forming the hash value of the preceding block, all data contained in the block, in particular the transactions of this block and, furthermore, further data such as a timestamp, a digital signature or a proof-of-work verification, are included in a function for forming a checksum, in particular a hash function. The blocks B1 to B3 have associated transaction data TD1 to TD3, which relate to a transaction or a plurality of transactions. In particular, all that is stored is a hash value that depends on a transaction. In addition to the transactions per se, a timestamp, a digital signature and a proof-of-work verification are also contained in each case. These are stored when a block is created.

Figure 3:
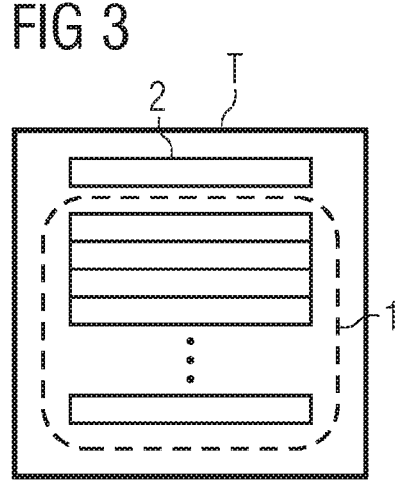
FIG. 3 shows a schematic illustration of a transaction according to the exemplary embodiment of the invention.

FIG. 3 elucidates a data structure of the transaction T, which is interchanged between the nodes in the blockchain network and which forms the basis of the transaction data in the blocks. In particular, it has a region in the data structure in which the device configuration information item 1 is stored. In particular, a checksum 2, which secures the device configuration information item 1, is additionally provided.

For the sake of an example, the following configuration data are contained in the device configuration information item 1:
Subject: Siemens SiABC;V1.3;SN=3175438
Public Device Key: 3A76E21876EFA03787FD629A65E9E990 . . .
Algorithm: ECC
Curve: brainpoolP160r1
Device Commissioning Identifier: ProtectionSwitch037E
ActiveApps: PredictiveMaintenance(basic), ContinuousSelfTest, StartupTest
ConfigParametersProtection: MaxI:60A, MaxU: 440V; MaxCosPhi:17
ConfigParametersPID: P:1,2; 1:0,7; D:0,2
ConfigDiagnosisServer:
https://diag.sgoperator.org/push/device3175438

The device—possibly with the aid of the above-described component—ascertains transactions that relate to the device and modifies its configuration depending on thereon.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A method for securely configuring a plurality of devices coupled to a blockchain network, including the following steps:
ascertaining, by one or more of the plurality of the devices or a central computer assigned to the plurality of devices that is located in a network including the plurality of devices, a blockchain data structure based on a cryptocurrency, wherein the blockchain data structure has at least one block with transaction data;
scanning, by the one or more of the plurality of devices or the central computer, for transactions available in the transaction data to determine whether any transaction includes a device configuration information item provided for the plurality of devices;
ascertaining, by the one or more of the plurality of devices or the central computer, at least one transaction associated with the transaction data, wherein the transaction includes the device configuration information item and wherein the transaction data specify an association of the device configuration information item to the plurality of devices and configuration data associated with the plurality of devices are ascertained therefrom;
checking, by the device or the central computer, the blockchain data structure to determine that the transaction was validated by the blockchain network;
assuming, by the one or more of the plurality of devices or the central computer, that the device configuration information is trustworthy based on the determination that the transaction was validated by the blockchain network without an independent check of the validity of the at least one transaction by any of the one or more of the plurality of devices and the central computer; and
configuring, by one or more of the plurality of devices or the central computer, the one or more of the plurality of devices depending on the device configuration information item in the case of a successful check of the blockchain data structure.

2. The method as claimed in claim 1, wherein the device configuration information item includes a configuration of the plurality of devices, a test value of a configuration of at least one of the plurality of devices and a reference to a configuration.

3. The method as claimed in claim 1, wherein the block has a checksum formed by the transaction or a plurality of transactions as the transaction data and the transaction or the plurality of transactions are validated by the checksum by a blockchain node.

4. The method as claimed in claim 1, wherein the transaction data or the transaction are secured by a cryptographic checksum and a check of the transaction data or the transaction is carried out with the aid of the cryptographic checksum and a cryptographic key.

5. The method as claimed in claim 4, wherein a key of a centrally managed key pair is used as the cryptographic key.

6. The method as claimed in claim 4, wherein a key of a key pair used within the blockchain data structure is used as the cryptographic key.

7. The method as claimed in claim 1, wherein a plurality of partial configurations for the plurality of devices are ascertained from the device configuration information item and the one or more of the plurality of devices is configured in accordance with the plurality of partial configurations.

8. The method as claimed in claim 7, wherein the partial configurations have priority specifications in order to prevent conflicts in the case of contradictory partial configurations.

9. The method as claimed in claim 1, wherein the device configuration information item has project planning parameters, mode of operation information items, license or authorization information items, secure zone information items, information items in relation to patches or software updates, association information items of the plurality of devices in relation to a backend, prescriptions for at least one of admissible configuration settings, and/or contract information items for incentive-able configuration settings.

10. The method as claimed in claim 1, wherein functionalities of the plurality of devices or parameters are adapted, or actions are carried out by the one or more of the plurality of devices, as a result of the configuring process.

11. The method as claimed in claim 1, wherein current transaction data of a configuration process are generated by the one or more of the plurality of devices for storage in a current block of a blockchain as a result of the configuring process.

12. A component for securely configuring a plurality of devices coupled to a blockchain network, comprising:
an interface device for ascertaining a blockchain data structure based on a cryptocurrency, wherein the blockchain data structure has at least one block with transaction data, for scanning for transactions available in the transaction data in view of whether any transaction includes a device configuration information item provided for the plurality of devices, and for ascertaining at least one transaction associated with the transaction data, wherein the transaction includes the device configuration information item and wherein the transaction data specify an association of the device configuration information item to the plurality of devices and configuration data associated with the plurality of devices are ascertained therefrom;
a first processor for checking the blockchain data structure to determine that the transaction was validated by the blockchain network;
a second processor for configuring the at least one of the plurality of devices depending on the device configuration information item when the first processor successfully checks the blockchain data structure, the second processor configured to assume that the device configuration information is trustworthy based on the determination that the transaction was validated by the blockchain network without any independent check of the validity of the at least one transaction.

13. The method as claimed in claim 2, wherein the reference to a configuration is a uniform resource identifier.

* * * * *